United States Patent [19]
Larsson

[11] Patent Number: 6,069,560
[45] Date of Patent: May 30, 2000

[54] DETECTOR FOR DETECTING VIBRATIONS

[75] Inventor: Roland Larsson, Helsingborg, Sweden

[73] Assignee: Covial Device AB, Helsingborg, Sweden

[21] Appl. No.: 09/029,492

[22] PCT Filed: Aug. 29, 1996

[86] PCT No.: PCT/SE96/01075

§ 371 Date: Feb. 28, 1998

§ 102(e) Date: Feb. 28, 1998

[87] PCT Pub. No.: WO97/08522

PCT Pub. Date: Mar. 6, 1997

[30] Foreign Application Priority Data

Aug. 30, 1995 [SE] Sweden ................................. 9502993

[51] Int. Cl.⁷ .................................................. G08B 21/00
[52] U.S. Cl. ......................... 340/540; 340/566; 340/683; 73/654; 324/207.2
[58] Field of Search ..................................... 340/566, 540, 340/683, 669, 529; 73/654, 514.31; 324/207.2, 207.15, 207.23; 280/735

[56] References Cited

U.S. PATENT DOCUMENTS

| | | | |
|---|---|---|---|
| 3,754,225 | 8/1973 | Gleason | 340/571 |
| 3,867,844 | 2/1975 | Shimizu et al. | 72/517 R |
| 4,338,823 | 7/1982 | Iwasaki | 73/654 |
| 4,361,045 | 11/1982 | Iwasaki | 73/517 R |
| 4,386,343 | 5/1983 | Shively | 340/529 |
| 4,521,768 | 6/1985 | Haran et al. | 340/566 |
| 4,864,288 | 9/1989 | Cross | 340/669 |
| 4,972,713 | 11/1990 | Iwata | 340/429 |
| 5,027,657 | 7/1991 | Juckenack et al. | 73/517 R |
| 5,068,643 | 11/1991 | Yashina | 340/571 |
| 5,483,225 | 1/1996 | Hwang | 340/566 |

FOREIGN PATENT DOCUMENTS

| | | |
|---|---|---|
| 0249509 | 12/1987 | European Pat. Off. . |
| 0625698 | 11/1994 | European Pat. Off. . |
| 0662606 | 7/1995 | European Pat. Off. . |
| 3639496 | of 0000 | Germany . |
| 2023318 | 12/1979 | United Kingdom . |
| 2260556 | 4/1993 | United Kingdom . |

*Primary Examiner*—Nina Tong
*Attorney, Agent, or Firm*—Ladas & Parry

[57] ABSTRACT

A security system having a vibration detector that senses vibration in any direction is disclosed. The vibration detector includes two or three detector elements that each have a magnet, and a coil or Hall-effect device that produces a signal in response to changes in a magnetic field in the vibration detector caused by movement of a magnet. The magnet in each detector element is mounted for reciprocating movement in one or more planes about a rest position. Each magnet is held temporarily in the rest position by springs. When three elements are used, the magnets are mounted on journalled shafts or on plate-like springs for reciprocal movement in directions that are at right angles to each other. When only two elements are used, the magnets are mounted on an elongate spring of substantially circular cross section so that the axial dimensions of the springs are at right angles to each other for reciprocating movement in all directions along a respective curved surface coinciding with a plane that is perpendicular to the axial dimension of the spring.

10 Claims, 7 Drawing Sheets

DETECTOR FOR DETECTING VIBRATIONS

BACKGROUND OF THE INVENTION

1. Field of the Invention

The present invention relates to a detector for detecting vibrations. More particularly the invention pertains to multi-dimensional or seismic vibration detectors.

2. Discussion of Related Art

There is a need in many contexts for a detector for detecting vibrations in, for example, a body to which the detector is fixed. Such a detector is suitable for employment in, for instance, the monitoring of bearings in rotary machines, for activating airbags, in burglar alarms etc. In many practical applications, it is also required that the direction of movement of the detected movement is identified.

For a detector which is used in a security system (burglar alarm), it is of great importance that the detector makes it possible at a very early stage to discover that a break-in is being attempted. It is highly desirable that the security system emits an alarm early, in other words before the break-in attempt has caused any major damage. This early warning system should be combined with an operative facility which ensures that an alarm is signalled only when a real attempted break-in is in progress.

It is previously known in the art to employ, in security systems, detectors which break or make a current circuit when, for example, a door is opened. The drawback in such detectors is that the alarm is made only when the thief has already gained access to the premises and, consequently, the thief has already caused material damage as a result of the break-in itself. The risk is imminent that the thief causes further damage to the interior of the premises when the alarm is sounded and/or when the thief takes goods away in connection with fleeing the scene of the crime.

Movement detectors in premises suffer from corresponding drawbacks since they only indicate a break-in once the thief is inside the premises.

Detectors based on sound analysis suffer from the drawback that the risk of a false alarm is great. In purely practical terms, it has proved that "break-in sound" cannot always be distinguished from "authorised" sound, for example in staircases in apartment buildings.

SUMMARY OF THE INVENTION

The above-outlined needs and wishes are satisfied by means of an apparatus according to the characterising clause of the appended independent claim.

Use of the detector according to the present invention in a security system makes it possible to detect attempts at break-in at a very early stage. The signals obtained from the detector have a very broad frequency spectrum, which makes it possible, for example by means of a signal analyser, to identify a commenced break-in attempt. When the signals from the detector include frequencies indicating vibrations within a predetermined frequency range/amplitudes (break-in indications), reliable detection of the break-in attempt takes place.

It will be obvious to a person skilled in the art that a seismic detector has a large field of application. The above-outlined application in break-in alarms constitutes but a single example of one field of application.

Further expedient embodiments of the present invention are disclosed in the appended subclaims.

BRIEF DESCRIPTION OF THE DRAWINGS

The present invention will now be described in greater detail hereinbelow, with particular reference to a number of drawings, in which.

DETAILED DESCRIPTION OF THE PREFERRED EMBODIMENTS

Figure 1:
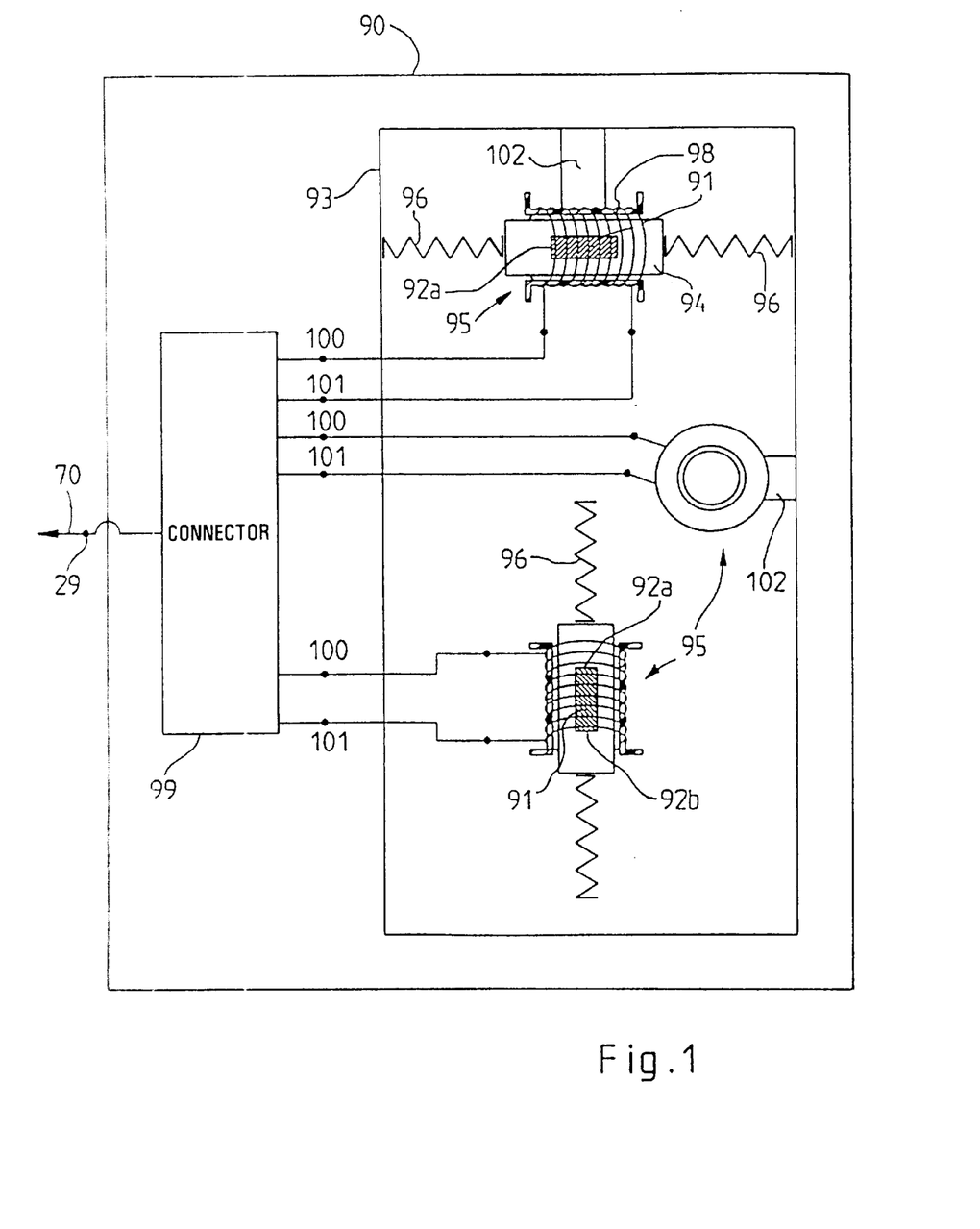
FIG. 1 is a cross-section through one embodiment of a magnetic, seismic detector in which electric coils are included.
Figure 1A:
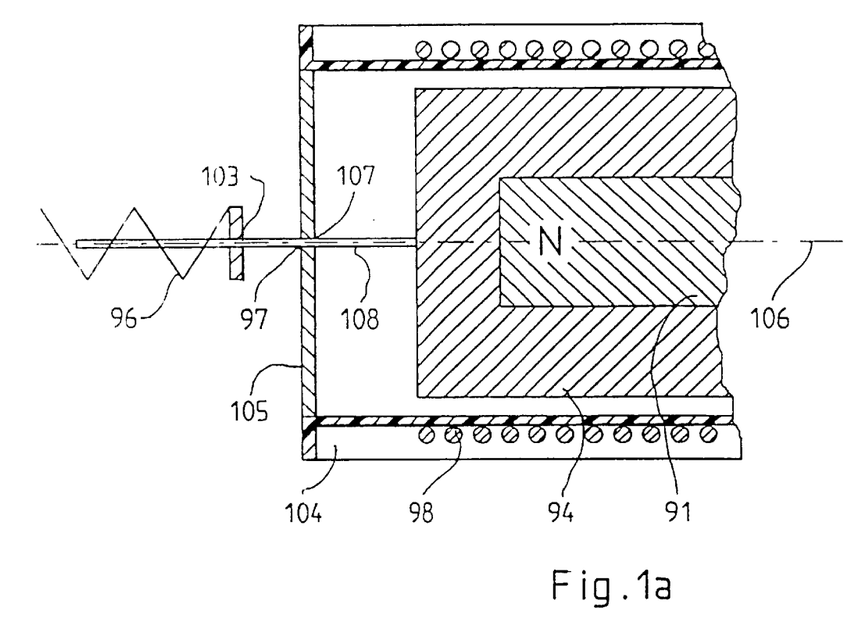
FIG. 1a is a detailed section of a part of a detector apparatus in the seismic detector according to FIG. 1.

FIGS. 1 and 1a show one embodiment of a seismic detector 90. The seismic detector comprises three detector devices 95 each one including a magnet 91 suspended in two spring means 96. The spring means are disposed such that each respective magnet is movable in one direction of movement which is substantially at right angles to a plane through the directions of movement of the two other magnets.

The figures show one embodiment in which the magnet in each respective detector device is fixed in a magnet holder 94 which in its turn is fixed at the two spring means 96. The holder is movable in the geometric axial direction 106 of a coil 98. Each respective magnet is oriented such that the magnetic north pole 92a and south pole 92b of the magnet are located substantially in the geometric axial direction of that coil which surrounds the holder and thereby the magnet. The coil has a coil core 104 which is provided at each end with a terminal disk 105 which is oriented such that the disk passes over the geometric centre axis 106 of the coil. The disk is disposed at such a distance from the holder 94 that the distance exceeds the maximum permitted displacement of the holder 94 from its rest position.

In the region of the geometric centre axis of the coil, there is provided an aperture 97 in the disk. The aperture forms a journal 107 for a mechanical shaft 108 which projects out from the holder 94 in a direction which substantially corresponds with the direction of the geometric centre axis of the coil. Outside the terminal disk 105 of the coil core, the mechanical shaft 108 is provided with a pressure plate 103 against which is secured the one end of each respective spring means 96. The other end is fixed to the casing 93 described below.

Figure 1B:
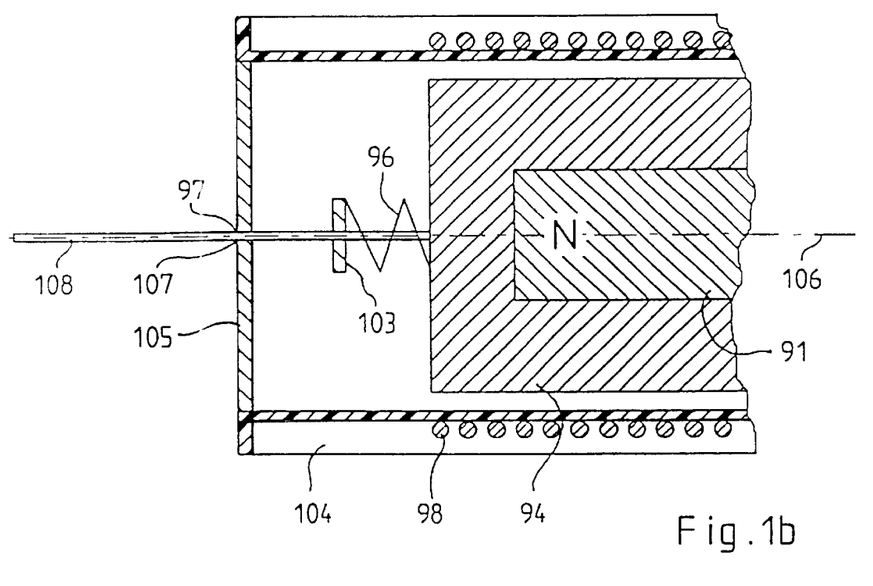
FIG. 1b is a detailed section corresponding to that of FIG. 1a but with an alternative placement of the spring means of the detector apparatus.

FIG. 1b shows one embodiment of a seismic detector 90 whose detector devices 95 are of a construction which substantially corresponds to that described with reference to FIGS. 1 and 1a, but in which the spring means 96 and the pressure plates 103 are disposed inside the terminal disks 105 of the coil. In such instance, the spring means are placed either between the pressure plates 103 and the magnet holder 94 or between the pressure plates 103 and the terminal disks 105 of the coil core. In the first alternative, the pressure plates 103 are fixed in relation to the coil core 104 while the mechanical shaft 108 is movably journalled in the pressure plates 103. In the second alternative, the pressure plates 103 are fixedly (immovably) connected to the mechanical shaft 108 which in its turn is axially displaceable in the journals 107 in the terminal disks 105 of the coil. The spring pressure and the siting of the rest position of the magnet holder 94 are adjusted, for example by placing the pressure plates at suitable positions along the mechanical shaft 108 and then fixing the pressure plates in these positions.

Figure 1C:
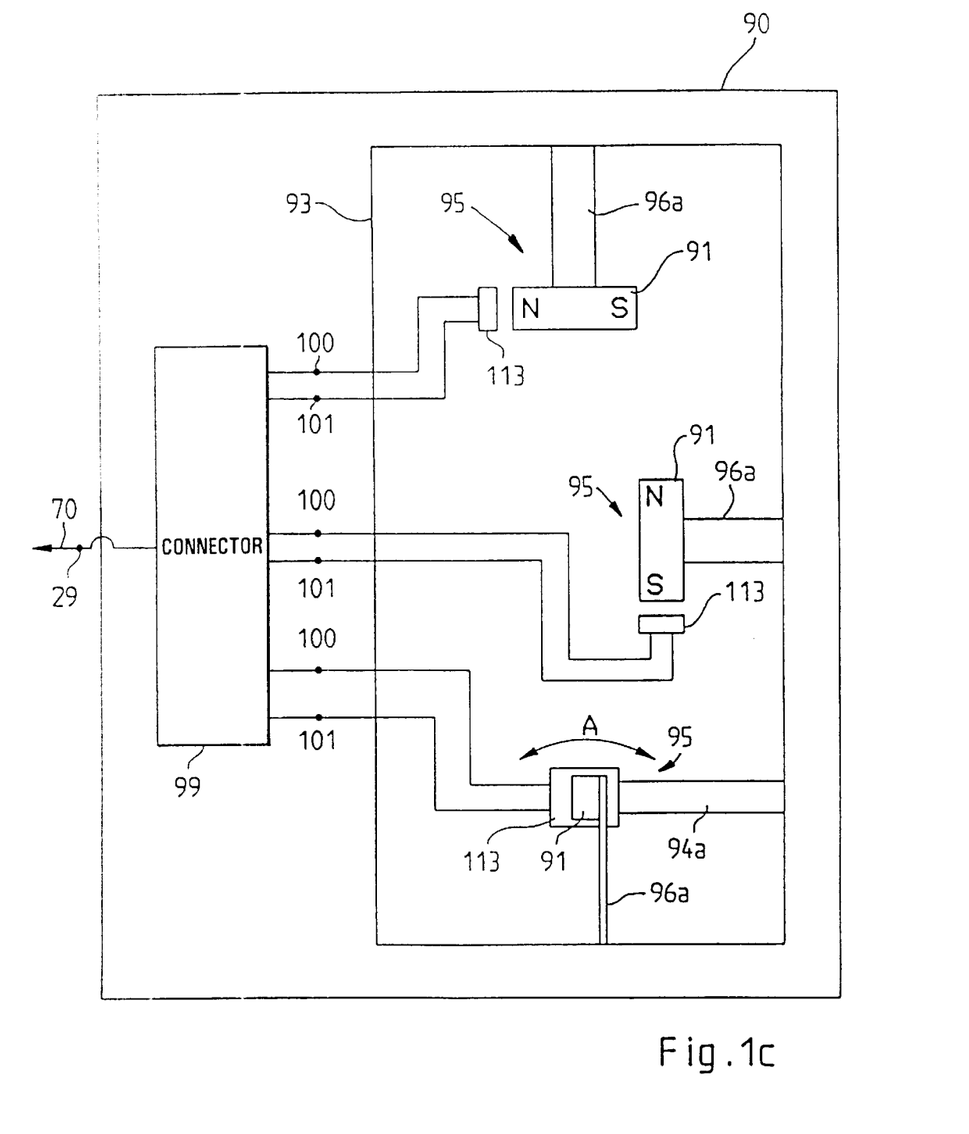
FIG. 1c shows one embodiment of the magnetic, seismic detector in which Hall elements are included.

FIG. 1c shows an embodiment of a seismic detector in which the magnets 91 of the detector devices 95 are disposed on plate-like spring means 96a which are each one fixed in their one end to the mechanically stable casing 93 of the detector. At their free end, the spring means carry the magnets. The thickness and/or length of each plate, together with the mass of that magnet which is disposed in the free end of the plate are selected so that the desired sensitivity to vibrations in the casing of the detector is obtained. The dimensions are adapted to the frequencies of the vibrations which it is desired are to be detected.

For each magnet 91, a Hall element 113 is provided at least adjacent the one pole of the magnet. The Hall element is fixed via a holder 94a to the mechanically stable casing 93 and thereby has a fixed position in relation to the casing. The electric outputs of the Hall element are connected to the electric device 99 which in turn is connected via its output 29 and signal connection 70 to the signal analyser 50. The plate-like spring means are oriented such that each spring means, and thereby each magnet, will oscillate in a direction which is substantially at right angles to the direction of oscillation of the two other magnets.

In yet a further embodiment, (not shown) the magnets are fixed to the free end of elongate spring means (for example a relatively long pin) of substantially circular cross-section. Thus, each magnet is free to oscillate in all directions along a curved surface substantially coinciding with a plane at right angles to the axial direction of the elongate spring means. For each such magnet, four Hall elements are provided at a relatively slight distance from the curved surface which the magnets form in their oscillations (pendulum notions). The Hall elements are placed in positions where the poles of the magnets pass the Hall elements during their oscillations, at least during large oscillations. combining at least two such spring means with their associated attached magnets and disposing the spring means with their axial directions oriented at right angles to one another, provides an array of two detectors which detects vibrations in the substrate irrespective of the direction of these vibrations.

The detector devices 95 are, in one embodiment, enveloped by a mechanically stable and generally tightly sealed casing 93. The casing protects the detector devices from mechanical damage and from impurities. From each respective coil or Hall element, electric leads are drawn out through the casing by a connector 99, which to register any current or voltage produced across the electric poles of the coil or in the Hall element when the magnet is displaced in relation to the coil or the Hall element. What is essential for the disclosed currents and voltages to be created is that each respective coil or Hall element have a fixed position in relation to the rest position of the magnet. Although the embodiment having a tightly sealed mechanically stable casing 93 is generally to be preferred, the coil holder 102 of the detector devices 95, the elongate spring means 96a, the Hall elements 113 etc. may, in other embodiments, be separate devices or units which are assembled on a substrate (carrier element), for example a circuit card.

Figure 2:
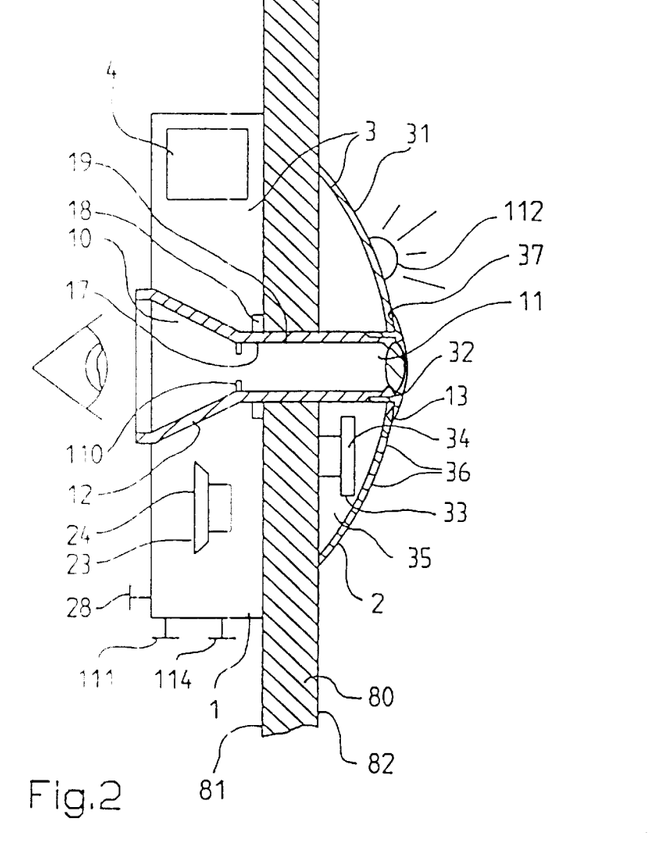
FIG. 2 is a cross-section through an installed security system comprising an inner part and an outer part.

On employment of the detector 90 in a security system of the version illustrated in FIG. 2, the seismic detector 90 is fixed against, for example, a door 80 which is to be protected against break-in. In an attempted break-in, vibrations occur in the door. These cause the seismic detector 90 to vibrate. Because of the mass in those bodies (magnet holder 94 and magnet 91) which are suspended in the spring means 96, the movement of the bodies deviates from the movement of that coil 98 which surrounds them, whereby the bodies and consequently also the magnet 91 are displaced in relation to the coil 98 for the Hall element 113. As a result of the changes to the magnetic flow which occurs, there will be generated measurable voltages across the electric poles of the coil, or measurable currents through the coil. The corresponding applies to the Hall element when this registers changes in the magnetic flow. The voltage and current changes correspond to the bodies' movement in relation to the mechanically stable casing.

FIG. 2 shows a security guard 3 (hereinafter also referred to as security system 3) mounted in a door 80. The system comprises a first part (the inner part of the system) 1 and a second part (the outer part of the system) 2. Both parts include an optical device (fish-eye) 10, electronic and electrical devices and signal devices 20,23,24,33,34 for emitting and receiving sound and/or light signals and also electric signals. In an assembled security system, the first part 1 and the second part 2 constitute a composite unit 3 which is generally of box-like physical appearance (apparatus box). The optical device is provided with a light intake portion 11 which is generally designed as a lens disposed in a region of the outer panel 82 of the door, with an image display portion 12 located in the region of or inside the inner panel 81 of the door.

In certain embodiments, the fish-eye is provided with an optical screening device, for example an iris shutter 110 for preventing a person outside the door from being able to perceive changes in the light conditions inside the door.

Figure 2A:
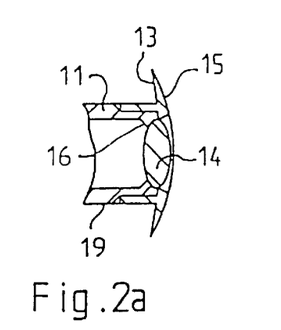
FIGS. 2a–c show detailed illustrations of the outer part in the region of a fish-eye included in the security system.
Figure 2B:
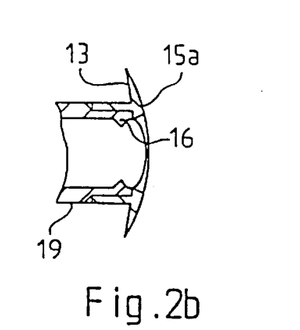
Figure 2C:
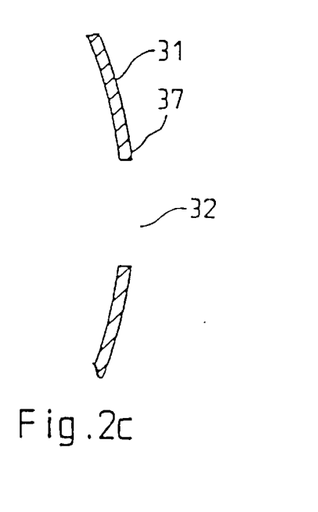

On the outside of the door, the apparatus box has a dome-shaped enclosure (shield) 31 having an aperture 32 for the light intake portion 11 of the fish-eye (c.f. FIGS. 2a–c). Around the aperture 32, the shield provides a surface 37 for co-operating with an abutment 13 disposed adjacent to the fish-eye 10. A microphone 33 and a loudspeaker 34 are also disposed in the space 35 between the shield and the door. The figure shows one embodiment in which the microphone and the loudspeaker comprise a single unit. In one embodiment, the loudspeaker is also operative to emit a siren alarm. In a further embodiment, the outer portion 2 is provided with a lamp 112 for illuminating visitors.

FIG. 2a shows a version of the lens portion 11 of the fish-eye in which the lens is provided with a circumferentially projecting ring 15. The ring forms the abutment 13 which abuts against the abutment 37 of the shield. Thus, the surface 13 holds the dome-shaped enclosure pressed against the outside 82 of the door. In order to fix the door shield, the tubular portion 19 of the fish-eye is, for example, in a region close to the inside of the door, provided with an outer thread 17 and a nut 18 which, on tightening, urges the abutment 13 of the fish-eye against the surface 37 of the shield 31 and thereby fixes the shield against the outside of the door. The shield 31 is also provided with apertures 36 which provide passages 36 for sound to and from the microphone 33 and loudspeaker 34 disposed in the space 35.

FIG. 2b shows another version of the arrangement of the lens 14 of the fish-eye. To this end, the ring 15 is provided with an annular portion projecting 15a inwardly towards the centre axes of the tubular portion 19, and with an inner lens holder 16. As in FIG. 2a, there this provides a safe and dependable fixing of the lens.

Figure 3:
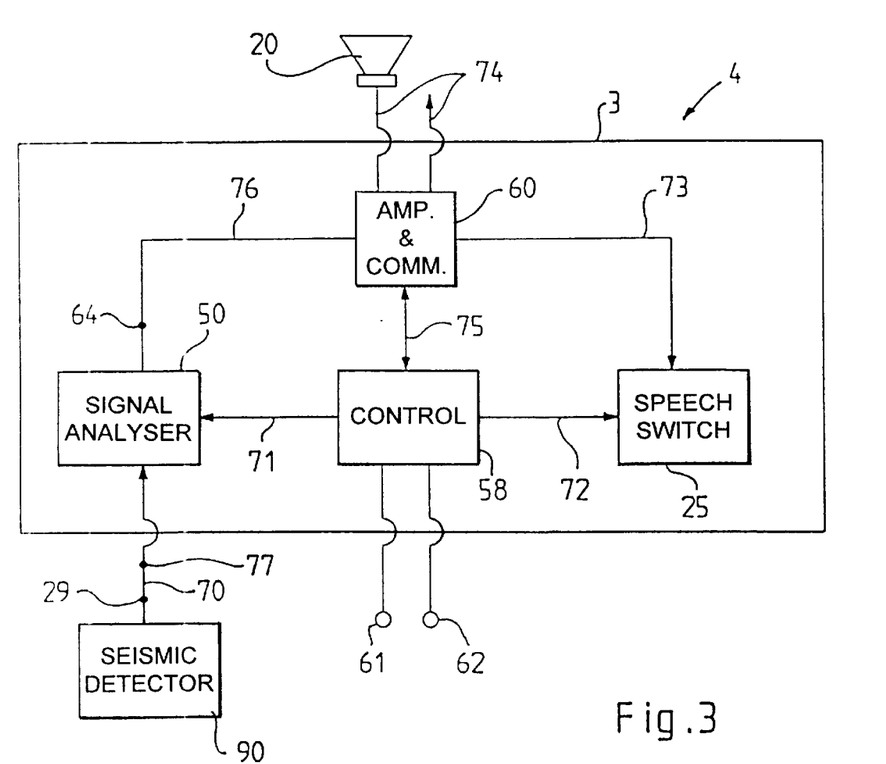
FIG. 3 is an electric block diagram for the security system.

The unit 3 includes electronic circuits interconnected so as to form part of a system. FIG. 3 shows one embodiment of a block diagram of the system. As a rule, the first part 1 is provided with a circuit card on which the major portion of the devices and circuits of the entire apparatus are placed. As a rule, integrated circuits are included in the different blocks. It will be obvious to the skilled reader of this specification that, if the need arises, the choice is made to realise, in one embodiment, the entire block diagram by means of but a few circuits, for example by means of only one or two integrated circuits. Mechanical switches, lamps 112, microphones 23,33, loudspeakers 24,34 etc. are, as a rule, mechanically fixed to the apparatus box. This minimises the number of physical change made to the door, as reducing installation work and possible maintenance work.

The block diagram according to FIG. 3 shows one embodiment of the present invention in which this includes a least one detector device 90 in the form of a seismic detector 90, a signal analyser 50, a control unit 58, a switching unit 25 and an amplifier and communication unit 60. The detector device 90 is, via an electric device 99 (Cf. FIG. 1 and FIG. 1c), connected to the signal analyser 50 by means of a signal connection 70, the signal analyser 50 is connected to the control unit 58 via a signal connection 71 and connected to the amplifier and communication unit 60 via a signal connection 76. The amplifier and communication unit 60 is connected to the switch unit 25 via a signal connection 73 and the switch unit 25 is in turn connected to the control unit 58 via a signal connection 72. A signal connection 75 is also provided between the control unit and the amplifier and communication unit 60. The control unit 58 is, as is apparent from the drawing figure, connected to all blocks in the block diagram by means of signal connections.

According to the embodiment illustrated in FIG. 3, microphones 23,33, loudspeakers 24,34, and requisite signalling devices such as sirens, horns, indicator lamps, etc. are connected to the amplifier and communication unit 60 via outgoing connections 74. The amplifier and communication unit 60 is also adapted to allow the connection of the specific external devices as may be required on each installation of a security guard system and generally satisfy the needs of each type of external device for signal, current or voltage supply. The figure shows the system in one embodiment in which the detector device 90 is directly connected to the signal analyser. It will be obvious to the skilled reader that the detector device is, in other practical applications, connected to other units in the system, preferably to the control unit 58. As a rule, the system includes a data bus which allows for the hook-up of supplementary devices or electronic circuits into the system. The data bus creates signal connections 95 between the different blocks and also often includes connections for the hook-up of external devices such as IR sensors, switches, smoke detectors, glass breakage detectors etc.

It has been indicated above that the blocks in the block diagram are connected by means of a signal connection. The expression signal connection is taken to signify that the connection as such consists of one or more signal connections, generally physical connections (electric leads or conductors), depending upon the relevant requirements which exist in respect of transfer of signals between the blocks. It will also be obvious to a person skilled in the art that, while only one physical connection is employed, this may, with the aid of separation by means of frequency splitting, modulation etc., in certain embodiments form more than one signal connection. Wireless transfer of signals is also encompassed in the term signal connection. Such a transfer is normally relevant only in certain practical applications, for example for transferring signals from the detector device 90 to the signal analyser 50 when the detector device is placed a large distance from the signal analyser, or in employment in temporary installations. Wireless transfer is possible irrespective of the relevant detection devices which, for example, may consist of a seismic detector, an IR detector, a magnet contact, a glass breakage detector etc. Both the detector device and the signal analyser 50 are, in this instance, connected to transmitters and receivers (not shown on the drawings).

In FIG. 3, inputs 61,62 for a power supply are also shown. As a rule, a battery space is provided in each system unit, either for ensuring the power supply is maintained during a power outage or as the sole power supply source of the system.

When the system according to the invention is employed for identifying a visitor, use is principally made of the fish-eye 10 in order, if possible, to identify the visitor. If necessary, use is made of both of the microphones 23,33 and both of the loudspeakers 24,34 for communication with a person outside the door.

In a simple version of the present invention, an operator on the inside 81 of the door manually activates the requisite microphones, loudspeakers and amplifiers in the event of needing to converse with a visitor. Activation takes place, for example, by means of a button 28 which is disposed on that part of the apparatus box which is located on the inside of the door. In this embodiment, the person inside the door also uses a similarly placed manual switch 25 for alternating the speech communication direction. The inner part of the security system is often provided with a switch 111 which is operative to light a lamp 112 which illuminates the visitor if the available light outside the door is insufficient for the person inside the door to be able to identify the visitor.

In more highly advanced embodiments, the manual speech exchange switch 25 is replaced by an automatic speech exchange unit which, via the signal connection 73 between the switch unit 25 and the amplifier and communication unit 60, transmits the requisite signals for controlling the speech direction. As a rule, the system also includes an additional manual auxiliary button 114 disposed on that part of the apparatus box which is located on the inner panel 81 of the door. For example, this auxiliary button sets off an alarm, for example via the signal device 20, and/or calls for assistance by other means. When the help button has been depressed, this is registered by the control unit 58 which, via the signal connection 75 to the amplifier and communication unit 60, sets off the alarm.

The seismic detector device 90 transmits detected signals to the input 77 of the signal analyser 50 via its output 29 and the signal connection 70. Incoming signals are analysed in the signal and open and when the signal analyser interprets these as "break-in signals", the signal analyser transmits the signal to the control unit 58 via the signal connection 71. The signal causes the control unit 58 activate the amplifier and communication unit 60 which, in turn, via the signal connection 74 emits the necessary signals for setting off predetermined alarms. The signal analyser 50 generally also includes a time monitor unit (to be described in greater detail below) which delays the information to the control unit 58 for a predetermined time before the signal to the control unit is transmitted.

Figure 3A:
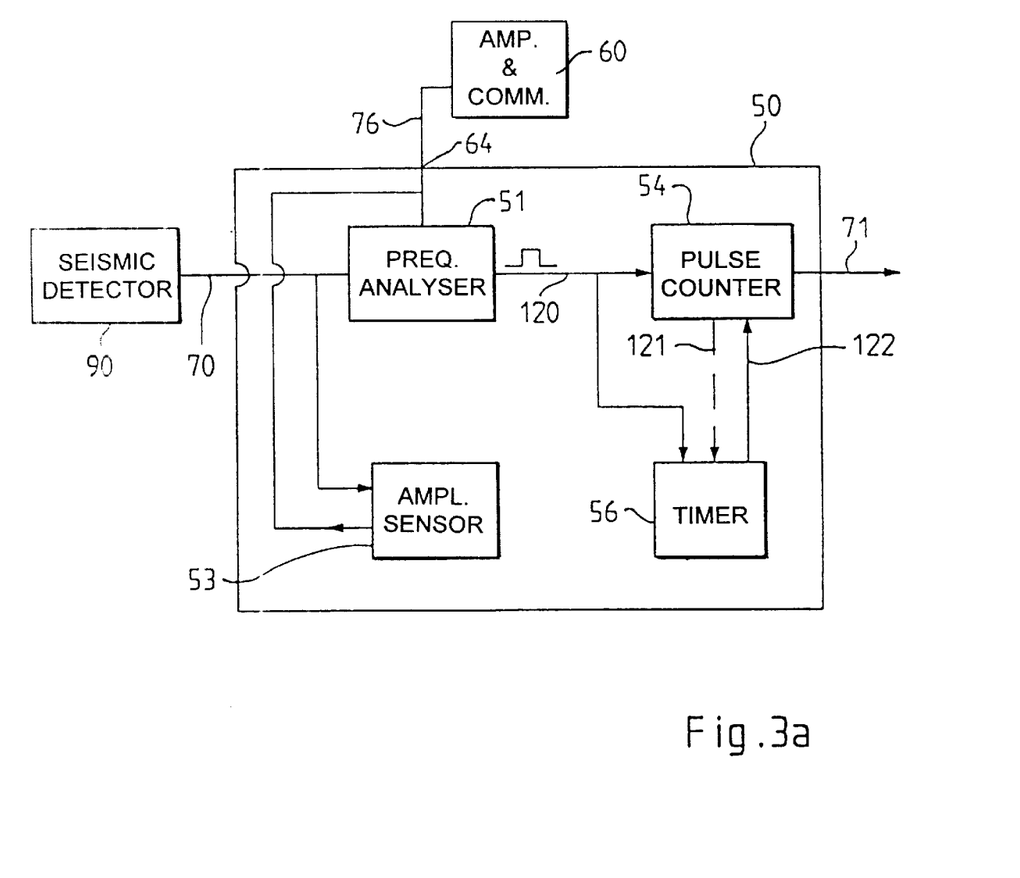
FIG. 3a is an embodiment of a signal analyser included in the security system.

FIG. 3*a* shows one embodiment of the signal analyser 50 for the system shown in FIG. 3. This analyser includes a frequency analyser 51, a pulse counter 54, an amplitude sensor 53 and a timer unit 56. The frequency analyser 51 includes a pulse generating circuit, a so-called monostable flip-flop or a Schmitt-trigger.

The amplitude sensor 53 and the frequency analyser 51 are connected to the input to the signal analyser 50 from the signal connection 70 between the seismic detector 90 and the signal analyser 50. The frequency analyser 51 is, via a signal connection 120, also connected to the pulse counter 54. The frequency analyser 51 is also provided with an output directly connected to the output 64 of the signal analyser 50. As a rule, the timer unit 56 is also connected to the output 64. Between the timer unit 56 and the pulse counter 54, there is provided a signal connection 122. The amplitude sensor also has an output directly connected to the output 64 of the signal analyser.

In FIG. 3*a*, broken lines illustrate an alternate embodiment of the signal analyser 50 in which the pulse counter 54 is connected via a signal connection 121 to the timer unit 56. In this instance, the pulse counter is operative to transmit, via the signal connection 121 signals which are controlled by those signals which the pulse counter 54 receives via the signal connection 120 from the frequency analyser 51.

Incoming signals from the seismic detector 90 via the signal connection 70 are analysed by the frequency analyser 51 which, upon detecting predetermined frequencies, transmits pulses to the pulse counter 54. The pulses are transmitted at predetermined intervals. These pulses, or signals controlled by these pulses, are also fed to the timer unit 56.

When the pulse counter 54 has registered a predetermined number of pulses, the signal analyser 50 emits, via the signal connection 71, a signal to the control unit 58 to the effect that a break-in has been registered, whereafter the control unit activates the predetermined alarm devices.

When the signals emitted by the seismic detector device are of amplitudes which exceed a predetermined level, the amplitude sensor 53 transmits (for example via a Schmitt-trigger with adjustable threshold value) a signal to the output 64 of the signal analyser 50 and via the signal connection 76 to the amplifier and communication unit 60 for its activation, whereafter predetermined alarm signals are emitted from the amplifier and communication unit over the signal connection 74.

In the embodiment according to FIG. 3*a*, the timer unit 56 receives signals from the frequency analyser 51 or from the pulse counter 54. The first signal received intializes the timer unit which blocks subsequent signals until the timer period has elapsed. When the timer period has elapsed, the timer unit produces a signal that initializes the pulse counter 54. When the next signal arrives at the timer unit, the above described cycle is repeated.

The timer 56 may, alternatively, continually send initialization zerolisation signals to the pulse counter 54 at predetermined intervals.

Generally, the timer period elsapses before the pulse counter is initialized is adjustable.

The time interval disclosed in the foregoing paragraph (the monitoring time) is adapted to the properties of the object which carries the detector or the ambient environment surrounding the object. Adaptation is effected, for example, in response to the object's (the window pane's) natural frequencies, the presence of ambient traffic, adjacent industry plants, etc.

In one embodiment, the security system is provided with a microswitch which activates the security system when the door is locked. In certain embodiments, the security system is also provided with a time monitoring facility which, after a predetermined and generally adjustable period of time, reactivates the speech communication section of the security system.

The above detailed description has referred to but a limited number of embodiments of the present invention, but it will be readily perceived by a person skilled in the art that the present invention encompasses a large number of embodiments without departing from the spirit and scope of the appended claims.

What is claimed is:

1. A detector system for a security device adapted for detecting vibration of an object in any of three mutually perpendicular directions, said detector system comprising:

a detector array including a plurality of detector devices, each detector device having a magnet supported for executing reciprocating movements in relation to a rest position, said magnets producing respective magnetic fields, a respective restraining means operationally associated with each magnet to support the respective magnet from the object, said restraining means holding said respective magnet in said rest position temporarily; and electrical means operationally associated with said detector devices for emitting an electric signal in response to a change in the magnetic fields produced by movement of said magnets relative to said electrical means, said restraining means of the magnets of the detector devices providing free movement in space of the magnets collectively in three mutually perpendicular directions to enable the electrical means to produce said electrical signal in response to vibration of the object in any of the three mutually perpendicular directions.

2. The detector system as claimed in claim 1, wherein said plurality of detector devices are three in number and the reciprocal movements of the magnets of the three detector devices are mutually perpendicular.

3. The detector means as claimed in claim 2, wherein said magnets of the detector devices are supported for oscillating movement about three mutually perpendicular axes.

4. The detector means as claimed in claim 2, wherein said magnets of said detector devices are supported for linear reciprocating movement along three mutually perpendicular axes.

5. The detector system as claimed in claim 2, wherein each said detector device comprises a coil having a longitudinal axis coincident with an axis of linear reciprocal movement of the respective magnet, said magnet having north and south magnetic poles disposed along said axis for movement relative to said coil, said coil providing an electrical signal to said electrical means in response to a change in the magnetic field produced by movement of said magnet relative to said coil.

6. The detector system as claimed in claim 1, wherein each said detector device comprises a Hall-effect device adjacent to a respective magnet for sensing movement of said magnet.

7. The detector system as claimed in claim 6, wherein said restraining means comprises a plate-like element having one end supported from the object and its other end being free and attached to a respective one of said magnets, said one end being pivotably supported to the object for movement about a respective one of said mutually perpendicular axes, so as to support said magnet for oscillating movement about said one end.

8. The detector system as claimed in claim 1, further comprising a signal analyzer for detecting a change in said electric signal emitted by said electrical means in response to movement of at least one of said magnets.

9. The detector means as claimed in claim 8, wherein said change in said signal is a change in a amplitude or frequency.

10. The detector system as claimed in claim 1, comprising a casing for said security device, said detector system being included in said casing, said object comprising a door into which said casing is mountable, said casing including an optical device for permitting visual inspection from one side of the door to the other.

* * * * *